(12) United States Patent
Gao et al.

(10) Patent No.: US 9,009,148 B2
(45) Date of Patent: Apr. 14, 2015

(54) CLICKTHROUGH-BASED LATENT SEMANTIC MODEL

(75) Inventors: Jianfeng Gao, Redmond, WA (US); Kristina Toutanova, Redmond, WA (US); Wen-tau Yih, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 13/329,345

(22) Filed: Dec. 19, 2011

(65) Prior Publication Data
US 2013/0159320 A1 Jun. 20, 2013

(51) Int. Cl.
*G06F 17/30* (2006.01)

(52) U.S. Cl.
CPC ................. *G06F 17/30867* (2013.01)

(58) Field of Classification Search
USPC .......................................... 707/748, 728, 780
See application file for complete search history.

(56) References Cited

U.S. PATENT DOCUMENTS

| | | | |
|---|---|---|---|
| 7,627,556 B2 | 12/2009 | Liu et al. | |
| 8,615,514 B1 * | 12/2013 | Fernandes et al. | 707/728 |
| 2005/0015366 A1 * | 1/2005 | Carrasco et al. | 707/3 |
| 2008/0195601 A1 * | 8/2008 | Ntoulas et al. | 707/5 |
| 2008/0270384 A1 * | 10/2008 | Tak | 707/5 |
| 2009/0125498 A1 * | 5/2009 | Cao et al. | 707/5 |
| 2009/0222437 A1 * | 9/2009 | Niu et al. | 707/5 |
| 2009/0248422 A1 | 10/2009 | Li et al. | |
| 2009/0292700 A1 * | 11/2009 | Castellani et al. | 707/6 |
| 2010/0161596 A1 | 6/2010 | Yan et al. | |
| 2010/0299350 A1 | 11/2010 | Konig et al. | |
| 2010/0332493 A1 | 12/2010 | Haas et al. | |
| 2011/0179081 A1 * | 7/2011 | Ovsjanikov et al. | 707/780 |
| 2011/0301935 A1 * | 12/2011 | Quirk et al. | 704/2 |
| 2012/0209847 A1 * | 8/2012 | Rangan | 707/737 |
| 2012/0233127 A1 * | 9/2012 | Solmer et al. | 707/661 |
| 2012/0296891 A1 * | 11/2012 | Rangan | 707/722 |

OTHER PUBLICATIONS

Wu, et al., "Case Study: Semantic-based Search and Query System for the Traditional Chinese Medicine Community", Retrieved at <<http://www.w3.org/2001/sw/sweo/public/UseCases/UniZheijang/>>, May 2007, pp. 4.

Lamberti, et al., "A Relation-Based Page Rank Algorithm for Semantic Web Search Engines", Retrieved at <<http://ieeexplore.ieee.org/stamp/stamp.jsp?arnumber=04538222>>, IEEE Transactions on Knowledge and Data Engineering, vol. 21, No. 1, Jan. 2009, pp. 123-136.

"Top 5 Semantic Search Engines", Retrieved at <<http://www.pandia.com/sew/1262-top-5-semantic-search-engines.html>>, Retrieved Date: Oct. 11, 2011, pp. 7.

Asuncion, et al., "On Smoothing and Inference for Topic Models", Retrieved at <<http://uai.sis.pitt.edu/papers/09/p27-asuncion.pdf>>, Proceedings of the Conference on Uncertainty in Artificial Intelligence (UAI), 2009, pp. 27-34.

(Continued)

*Primary Examiner* — Noosha Arjomandi
(74) *Attorney, Agent, or Firm* — Sandy Swain; Doug Barker; Micky Minhas

(57) ABSTRACT

There is provided a computer-implemented method and system for ranking documents. The method includes identifying a number of query-document pairs based on clickthrough data for a number of documents. The method also includes building a latent semantic model based on the query-document pairs and ranking the documents for a search based on the latent semantic model.

11 Claims, 6 Drawing Sheets

(56) References Cited

OTHER PUBLICATIONS

Berger, et al., "Information Retrieval as Statistical Translation", Retrieved at <<http://mti.ugm.ac.id/~adji/courses/resources/doctor/scholargoogle/StatisticalTranslation99.pdf>>, In Proceedings of the ACM SIGIR Conference on Research and Development in Information Retrieval, Jan. 12, 1999, pp. 18.

Blei, et al., "A Correlated Topic Model of Science", Retrieved at <<http://faculty.chicagobooth.edu/workshops/econometrics/archive/autumn08/blei_correlated_topic.pdf>>, The Annals of Applied Statistics, vol. 1, No. 1, 2007, pp. 17-35.

Blei, et al., "Latent Dirichlet Allocation", Retrieved at <<http://www.stefanoperna.it/wiki/data/media/universita/tesi/1_bleingjordan20031.pdf>>, Journal of Machine Learning Research, vol. 3, 2003, pp. 993-1022.

Brown, et al., "The Mathematics of Statistical Machine Translation: Parameter Estimation", Retrieved at <<http://acl.idc.upenn.edu/J/J93/J93-2003.pdf>>, Computational Linguistics—Special issue on using large corpora: II, vol. 19, No. 2, Jun. 1993, pp. 263-311.

Burges, et al., "Learning to Rank using Gradient Descent", Retrieved at <<http://mir.cs.nthu.edu.tw/users/felix/relatedPaper/012_LearningToRank_BurgesEtAl.pdf>>, Proceedings of the 22nd international conference on Machine learning (ICML), 2005, pp. 89-96.

Chien, et al., "Adaptive Bayesian Latent Semantic Analysis", Retrieved at <<http://ieeexplore.ieee.org/stamp/stamp.jsp?arnumber=04381232>>, IEEE Transactions on Audio, Speech, and Language Processing, vol. 16 No. 1, Jan. 2008, pp. 198-207.

Freitas, et al., "Bayesian Latent Semantic Analysis of Multimedia Databases", Retrieved at <<https://www.cs.ubc.ca/labs/lci/papers/docs2001/nando-blsa.pdf>>, Tech Report TR-2001-15, Oct. 22, 2001, pp. 36.

Deerwester, et al., "Indexing by Latent Semantic Analysis", Retrieved at <<http://www.cob.unt.edu/itds/faculty/evangelopoulos/dsci5910/LSA_Deerwester1990.pdf>>, Journal of the American Society for Information Science, vol. 41, No. 6, Sep. 1990, pp. 391-407.

Dempster, et al., "Maximum Likelihood from Incomplete Data via the EM Algorithm", Retrieved at <<http://www.cnbc.cmu.edu/~tai/readings/classics/Dempster.pdf>>, Journal of the Royal Statistical Society Series B (Methodological), vol. 39, No. 1, 1977, pp. 39.

Dumais, et al., "Automatic Cross-linguistic Information Retrieval using Latent Semantic Indexing", Retrieved at <<http://citeseer.ist.psu.edu/viewdoc/download?doi=10.1.1.50.5717&rep=rep1&type=pdf>>, in AAAI Spring Symposium Series: Cross-Language Text and Speech Retrieval, 1997, pp. 1-7.

Ganchev, et al., "Posterior Regularization for Structured Latent Variable Models", Retrieved at <<http://jmlr.csail.mit.edu/papers/volume11/ganchev10a/ganchev10a.pdf>>, Journal of Machine Learning Research, vol. 11, 2010, pp. 2001-2049.

Gao, et al., "Clickthrough-based Translation Models for Web Search: From Word Models to Phrase Models", Retrieved at <<http://citeseerx.ist.psu.edu/viewdoc/download?doi=10.1.1.172.7831&rep=rep1&type=pdf>>, CIKM, Oct. 26-29, 2010, pp. 10.

Gao, et al., "Model Adaptation via Model Interpolation and Boosting for Web Search Ranking", Retrieved at <<http://www.aclweb.org/anthology-new/D/D09/D09-1053.pdf>>, Proceedings of the Conference on Empirical Methods in Natural Language Processing (EMNLP), Aug. 6-7, 2009, pp. 505-513.

Gao, et al., "Smoothing Clickthrough Data for Web Search Ranking", retrieved at <<http://citeseerx.ist.psu.edu/viewdoc/download-?doi=10.1.1.1502058&rep=rep1&type=pdf>>, SIGIR, Jul. 19-23, 2009, pp. 9.

Girolami, et al., "On an Equivalence between PLSA and LDA", Retrieved at <<http://citeseerx.ist.psu.edu/viewdoc/download-?doi=10.1.1.14.6893&rep=rep1&type=pdf>>, SIGIR, Jul. 28-Aug. 1, 2003, pp. 433-434.

Griffiths, et al., "Topics in Semantic Representation", Retrieved at <<http://psiexp.ss.uci.edu/research/papers/Griffiths_Steyvers_Tenenbaum_2007.pdf>>, Psychological Review, vol. 114, No. 2, 2007, pp. 211-244.

Hofmann, Thomas, "Probabilistic Latent Semantic Indexing", Retrieved at <<http://www.cs.brown.edu/~th/papers/Hofmann-SIGIR99.pdf>>, Proceedings of the 22nd annual international ACM SIGIR conference on Research and development in information retrieval (SIGIR), 1999, pp. 50-57.

Huang, et al., "Exploring Web Scale Language Models for Search Query Processing", Retrieved at <<http://research.microsoft.com/pubs/121455/wfp0419-Huang-final.pdf>>, In Proceedings of the World Wide Web Conference (WWW), Apr. 26-30, 2010, pp. 451-460.

Järvelin, et al., "IR Evaluation Methods for Retrieving Highly Relevant Documents", Retrieved at <<http://citeseerx.ist.psu.edu/viewdoc/download?doi=10.1.1.20.2887&rep=rep1&type=pdf>>, Proceedings of the 23rd Annual International ACM SIGIR Conference on Research and Development in Information Retrieval (SIGIR), 2000, pp. 41-48.

Jin, et al., "Title Language Model for Information Retrieval", Retrieved at <<http://www.cs.cmu.edu/~czhai/paper/sigir2002-titlemod.pdf>>, Proceedings of the 25th annual international ACM SIGIR conference on Research and development in information retrieval (SIGIR), Aug. 11-15, 2002, pp. 42-48.

Koehn, et al., "Statistical Phrase-based Translation", Retrieved at <<http://www-rohan.sdsu.edu/~gawron/mt_plus/readings/phrase/read/koehn-ochs-marcu-stat-phrase-based-mt.pdf>>, Proceedings of the 2003 Conference of the North American Chapter of the Association for Computational Linguistics on Human Language Technology (HLT/NAACL), May-Jun. 2003, pp. 48-54.

Manning, et al., "Foundations of Statistical Natural Language Processing", Retrieved at <<http://cs.famaf.unc.edu.ar/~laura/llibres/snlp.pdf>>, The Massachusetts Institute of Technology (MIT) Press, 1999, pp. 704.

Mimno, et al., "Polylingual Topic Models", Retrieved at <<http://acl.eldoc.ub.rug.nl/mirror/D/D09/D09-1092.pdf>>, In Proceedings of the Conference on Empirical Methods in Natural Language Processing (EMNLP) Aug. 6-7, 2009, pp. 880-889.

Och, Franz, Josef, "Statistical Machine Translation: From Single-word Models to Alignment Templates", Retrieved at <<http://ssli.ee.washington.edu/~-mhwang/pub/others/Och_SMT_From_Single-Word_Models_to_Alignment_Templates_Dissertation_08Oct2002.pdf>>, PhD thesis, RWTH Aachen, 2002, pp. 170.

Platt, et al., "Translingual Document Representations from Discriminative Projections", Retrieved at <<http://www.aclweb.org/anthology/D/D10/D10-1025.pdf>>, Proceedings of the 2010 Conference on Empirical Methods in Natural Language Processing (EMNLP), Oct. 9-11, 2010, pp. 251-261.

Ponte, et al., "A Language Model Approach to Information Retrieval", Retrieved at <<http://www.computing.dcu.ie/~gjones/Teaching/CA437/p275.pdf>>, Proceedings of the 21st annual international ACM SIGIR conference on Research and development in information retrieval (SIGIR), 1998, pp. 275-281.

Svore, et al., "A Machine Learning Approach for Improved BM25 Retrieval", Retrieved at <<http://citeseerx.ist.psu.edu/viewdoc/download?doi=10.1.1.159.5505&rep=rep1&type=pdf>>, Proceedings of the 18th ACM conference on Information and knowledge management (CIKM), Nov. 2-6, 2009, pp. 4.

Vinokourov, et al., "Inferring a Semantic Representation of Text via Cross-language Correlation Analysis", Retrieved at <<http://citeseerx.ist.psu.edu/viewdoc/download?doi=10.1.1.73.6765&rep=rep1&type=pdf>>, Advances of Neural Information Processing Systems (NIPS), vol. 15, 2002, pp. 1473-1480.

Wang, et al., "Multi-style Language Model for Web Scale Information Retrieval", Retrieved at <<http://59.108.48.12/proceedings/sigir/sigir2010/docs/p467.pdf>>, Proceedings of the 33rd Annual ACM SIGIR Conference (SIGIR), Jul. 19-23, 2010, pp. 467-474.

Wei, et al., "LDA-based Document Models for Ad-hoc Retrieval", Retrieved at <<http://citeseerx.ist.psu.edu/viewdoc/download-?doi=10.1.1.88.9126&rep=rep1&type=pdf>>, Proceedings of the 29th annual international ACM SIGIR conference on Research and development in information retrieval (SIGIR), Aug. 6-11, 2006, pp. 178-185.

(56) References Cited

OTHER PUBLICATIONS

Yih, et al., "Learning Discriminative Projections for Text Similarity Measures", Retrieved at <<http://aclweb.org/anthology/W/W11/W11-0329.pdf>>, Proceedings of the Fifteenth Conference on Computational Natural Language Learning (CoNLL), Jun. 23-24, 2011, pp. 247-256.

Zhai, et al., "A Study of Smoothing Methods for Language Models Applied to Ad Hoc Information Retrieval", Retrieved at <<http://net.pku.edu.cn/~course/obsolete/cs410sp2007/sigir2001-smooth.pdf>>, Proceedings of the 24th annual international ACM SIGIR conference on Research and development in information retrieval (SIGIR), Sep. 9-12, 2001, pp. 334-342.

* cited by examiner

100

200

400

500

CLICKTHROUGH-BASED LATENT SEMANTIC MODEL

BACKGROUND

Many modern search engines retrieve Web documents by literally matching terms in the Web documents with those in a search query using lexical matching methods. However, such lexical matching methods can be inaccurate due to language discrepancies between Web documents and search queries. For example, language discrepancies often occur because concepts are expressed using different vocabularies and language styles in Web documents versus search queries. Therefore, in many cases, the retrieval of appropriate Web documents relating to a particular search query may be difficult due to such language discrepancies.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to a system and method for performing searches using a clickthrough-based latent semantic model. An embodiment provides a computer-implemented method for ranking documents. The method includes identifying a number of query-document pairs based on clickthrough data for a number of documents. The method also includes building a latent semantic model based on the query-document pairs and ranking the documents for a search based on the latent semantic model.

Another embodiment provides a system for ranking documents. The system includes a processor that is adapted to execute stored instructions and a system memory. The system memory includes code configured to identify a number of query-title pairs based on clickthrough data for a number of documents. The system also includes code configured to build a latent semantic model based on the query-title pairs by learning a semantic representation of a query based on the likelihood that the query is a semantics-based translation of each of the documents. The system further includes code configured to rank the documents for a search based on the latent semantic model.

In addition, another embodiment provides one or more non-volatile, computer-readable storage media for storing computer-readable instructions. The computer-readable instructions provide a document ranking system when executed by one or more processing devices. The computer-readable instructions include code configured to identify a number of query-title pairs based on clickthrough data for a number of documents. The computer-readable instructions also include code configured to build a latent semantic model by using the query-title pairs to learn a projection matrix and map vector representations of a query and a title of each of the documents to a semantic space using the projection matrix. The computer-readable instructions further include code configured to rank the documents for a search based on a distance between the vector representations of the query and the title of each of the documents within the semantic space.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Embodiments disclosed herein set forth a method and system for ranking documents for a search using a latent semantic model. The latent semantic model described herein is based on methods of semantic representation and the statistical translation-based approach to information retrieval (IR). The latent semantic model may assume that a query is parallel to the titles of the documents clicked on for that query. Therefore, a number of query-title pairs may be constructed from clickthrough data. Moreover, the latent semantic model may be learned from such clickthrough data.

In various embodiments, the latent semantic model may be a bilingual topic model within the language modeling framework. The bilingual topic model may rank documents for a query according to the likelihood that the query is a semantics-based translation of the documents. The semantic representation may be language-independent and may be learned from query-title pairs. The bilingual topic model may assume that a query and its paired titles share the same distribution over semantic topics, possibly expressed using different vocabularies or language styles. Furthermore, in various embodiments, the latent semantic model may be a discriminative projection model within the vector space modeling framework. The discriminative projection model may be learned discriminatively such that the distance between a query and its paired title, both represented as vectors in a projected semantic space, is smaller than the distance between the query and the titles of other documents which have no clicks for that query.

Figure 1:
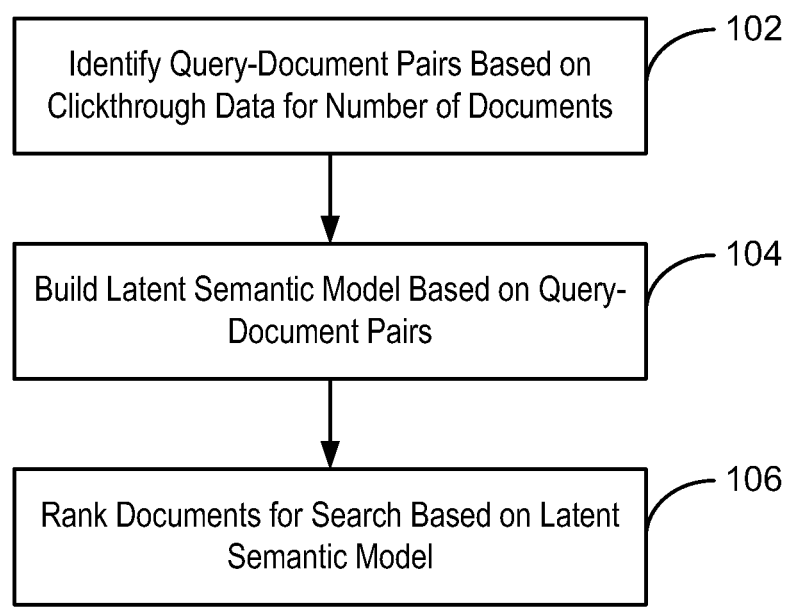
FIG. 1 is a process flow diagram of a method for ranking documents using a latent semantic model.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As used herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

As used herein, terms "component," "search engine," "browser," "server," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory, computer-readable device, or media. Non-transitory, computer-readable storage media can include, but are not limited to, tangible magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

FIG. 1 is a process flow diagram of a method 100 for ranking documents using a latent semantic model. The method 100 may be implemented within a networking environment or a computing environment, as described further with respect to FIGS. 5-6. In various embodiments, the method 100 may be used to rank and reorder documents in a search by determining a relevance of each document to a query. The search may be conducted, for example, over a network via a search engine, e.g., a Web search. In some embodiments, the relevance of each document to a particular query may be determined by mapping the query and each of the documents into semantic representations in a language-independent manner.

The method 100 begins at block 102 with the identification of a number of query-document pairs based on clickthrough data for a number of documents. In one embodiment, the query-document pairs may be query-title pairs, where the title is a title of the document. This may be accomplished, for example, by determining a relevance of each of the documents to a query in a language-independent manner and pairing the query with a title of each related document. In various embodiments, clickthrough data may also be used to determine the query-title pairs. Clickthrough refers to the process of a user clicking on a hyperlink for a document returned in a search. The clickthrough data records an association between the search terms and the "clicked" document. In some embodiments, clickthrough data from query log files may be used to generate the query-title pairs.

At block 104, a latent semantic model may be built based on the query-document pairs. In some embodiments, the query and the documents may be considered as two different languages, i.e., the query language and the document language. As used herein, the term "language" may refer to a constructed language (e.g., English, Spanish, or French), a particular vocabulary, or a particular language style, among others. The query and the documents may be assumed to share a common distribution of semantic topics. However, because the common distribution of semantic topics may be expressed by the query and the documents using different languages, the latent semantic model may be learned such that relationships between terms in a document and terms in a query are mapped at the semantic level rather than at the word level.

At block 106, the documents may be ranked for a Web search based on the latent semantic model. Ranking the documents may include reordering the documents for the Web search based on the relevance of each of the documents to the query. For example, the documents may be ranked based on the latent semantic model such that the document with the semantic representation that most closely matches the semantic representation of the query is presented as the most relevant document for the Web search. In some embodiments, the documents may be assigned a relevance label based on a relevance scale. For example, the relevance scale may range from 0 to 4, wherein a document with a relevance label of 4 is considered to be most relevant to a corresponding query.

Figure 2:
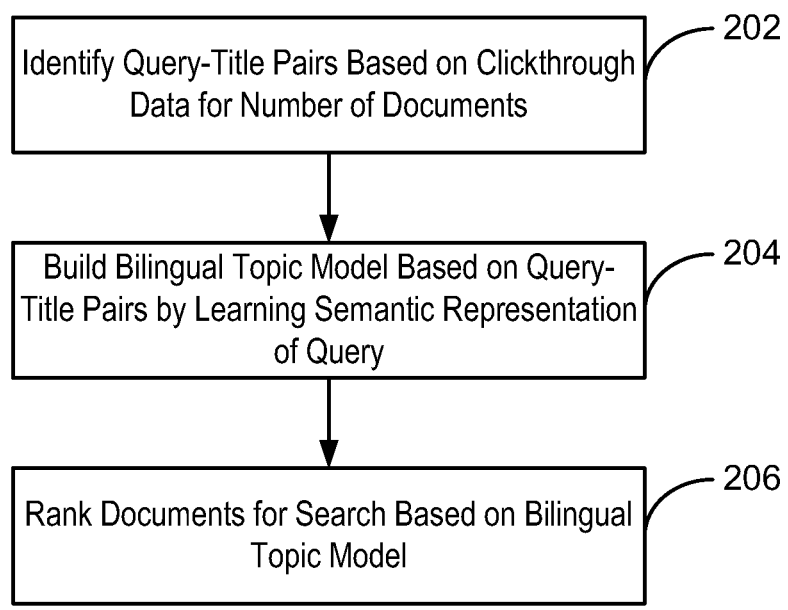
FIG. 2 is a process flow diagram of a method for ranking documents using a bilingual topic model.

FIG. 2 is a process flow diagram of a method 200 for ranking documents using a bilingual topic model. The bilingual topic model is a type of latent semantic model, as described with respect to FIG. 1. The bilingual topic model may be used to rank documents for a Web search according to the relevance of the documents to a query. The Web search may be conducted, for example, over a network via a search engine.

The method 200 begins at block 202 with the identification of a number of query-title pairs based on clickthrough data for a number of documents. In various embodiments, this may be accomplished using the clickthrough data to pair the query with each of a number of related documents that have been clicked on for the query.

In some embodiments, the hidden topics of the query-title pairs may be identified in a language-independent manner. Hidden topics are also referred to herein as language-independent semantic representations. The hidden topics may be identified using maximum a posteriori (MAP) estimation techniques, which may be used to obtain an estimate of an unobserved quantity based on empirical data. Further, in some embodiments, the hidden topics of the query-title pairs may be identified in a language-independent manner using the posterior regularization technique-, which is used to enforce constraints on expectation of an unobserved quantity based on empirical data. The use of MAP estimation techniques and posterior regularization techniques for the method and system described herein is discussed further with respect to FIG. 3.

At block 204, a bilingual topic model may be built based on the query-title pairs by learning a semantic representation of a query and its paired document title. The semantic representation of the query may be language-independent and may be used to map the query to documents with related topic distributions. This may allow for the identification of similarities between a query and documents that do not share common vocabularies or language styles but, rather, share a common overall topic. The semantic representation of the query may be learned from topic-specific query-word distributions that are generated from the query-title pairs.

At block 206, the documents may be ranked for a search query based on the bilingual topic model. In some embodiments, the documents may be ranked based on the probability that a particular document relates to a specific query. The documents may also be reordered for the Web search such that the most relevant documents, i.e., the documents with the highest probability, appear at the top of the Web search results list.

Figure 3:
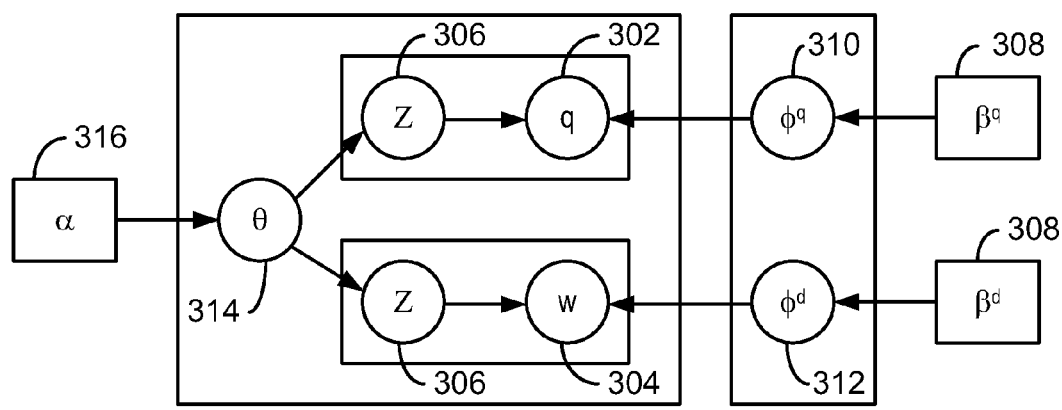
FIG. 3 is schematic illustrating how query-document pair is generated using the bilingual topic model.

FIG. 3 is schematic 300 illustrating how a query-document pair is generated using the bilingual topic model. The schematic 300 also illustrates the way the bilingual topic model is learned from clickthrough data and the method 200 for ranking documents using the bilingual topic model. According the bilingual topic model, it may be assumed that a query 302, $q=q_1 \ldots q_{|q|}$ and its paired title 304, $d=w_1 \ldots w_{|d|}$ share a common distribution of topics, but use different vocabularies to express these topics. In order to generate a query-title pair, for each topic 306, z, a pair of different word distributions $(\phi_z^q, \phi_z^d)$ is selected from a Dirichlet prior with concentration parameter 308, $\beta$. The word distribution $\phi_z^q$ is a topic-specific query-word distribution, and the word distribution $\phi_z^d$ is a topic-specific title-word distribution. Assuming there are T topics, we have two sets of distributions, the distribution 310, $\phi^q=(\phi_1^q, \ldots, \phi_T^q)$, and the distribution 312, $\phi^d=(\phi_1^d, \ldots, \phi_T^d)$.

For each query and its paired title, a topic distribution 314 $\theta^{q,d}$ is drawn from a Dirichlet prior with concentration parameter 316, a. Each term in the query is then generated by selecting a topic 306, z, according to the topic distribution 314, $\theta^{q,d}$, and drawing a word from $\phi_z^q$. Similarly, each term in the paired title is generated by selecting a topic 306, z, according to the topic distribution 314 $\theta^{q,d}$ and drawing a word from the word distribution $\phi_z^d$. Thus, the log-likelihood of a corpus of query-title pairs, together with the paired document-topic vectors and word-topic vectors, is as follows:

$$\log(P(\phi^q|\beta^q)P(\phi^d|\beta^d)\pi_{(q,d)}P(\theta|\alpha)P((q,d)|\theta^{q,d},\phi^q,\phi^d)), \quad (1)$$

where $$P((q,d)|\theta^{q,d},\phi^q,\phi^d)=\pi_{q\in q}\Sigma_z P(q|\phi_z^q)P(z|\theta^{q,d})\cdot\pi_{w\in d}\Sigma_z P(w|\phi_z^d|\theta^{q,d}) \quad (2)$$

In various embodiments, MAP estimation may be used to estimate the parameters 314, 310, and 312 ($\theta^{q,d}$, $\phi^q$, $\phi^d$). The posterior probabilities for each term q in query 302, q, and each term w in its paired title 304, d, are computed for the topics 306 according to the following equations:

$$P(z|q,\theta^{q,d}) = \frac{P(q|\phi_z^q)P(z|\theta^{q,d})}{\Sigma_{z'}P(q|\phi_{z'}^q)P(z'|\theta^{q,d})}, \quad (3)$$

and $$P(z|w,\theta^{q,d}) = \frac{P(w|\phi_z^d)P(z|\theta^{q,d})}{\Sigma_{z'}P(w|\phi_{z'}^d)P(z'|\theta^{q,d})} \quad (4)$$

The parameters may then be updated for the given posterior probabilities. The concentration parameters 316 and 308, i.e., $\alpha$, $\beta^d$, and $\beta^q$, may be treated as hyperparameters, each corresponding to one Dirichlet prior. Further, Q may be denoted as the size of the query vocabulary, and W may be denoted as the size of the title vocabulary. The frequency of term q in query 302, q, may be expressed as n(q, q), and the frequency of term w in title 304, d, may be expressed as n(w, d). Also, $N_{q,z}^{q,d}$ may be equal to n(q, q)P(z|q, $\theta^{q,d}$), and $N_{w,z}^{q,d}$ may be equal to n(w, d)P(z|w, $\theta^{q,d}$). Then, the updates to the parameters can be written according to the following equations:

$$P(q|\phi_z^q) = \frac{\beta^q - 1 + \Sigma_{(q,d)}N_{q,z}^{q,d}}{Q\beta^q - Q + \Sigma_{(q,d),q'}N_{q',z}^{q,d}}, \quad (5)$$

$$P(w|\phi_z^d) = \frac{\beta^d - 1 + \Sigma_{(q,d)}N_{w,z}^{q,d}}{W\beta^d - W + \Sigma_{(q,d),w'}N_{w',z}^{q,d}}, \quad (6)$$

and $$P(z|\theta^{q,d}) = \frac{\alpha - 1 + (\Sigma_q N_{q,z}^{q,d} + \Sigma_w N_{w,z}^{q,d})}{T\alpha - T + \Sigma_{z'}\left(\Sigma_q N_{q,z'}^{q,d} + \Sigma_w N_{w,z'}^{q,d}\right)}. \quad (7)$$

A paired query and title are expected to not only share the same prior distribution over topics, but also contain similar fractions of words assigned to each topic. Since MAP estimation of the shared topic vector is concerned with explaining the union of tokens in the query and document and can be easily dominated by the longer one of the two, it does not guarantee that each topic z occurs with similar frequency in the query and title. Thus, in some embodiments, the paired query and title may be constrained to have similar fractions of tokens assigned to each topic. Such a constraint may be enforced on expectation using posterior regularization. For example, the posterior distributions of topics computed on a query-title pair (q, d) may be projected onto a constrained set of distributions, for which the expected fraction of tokens in q that are assigned topic t is the same as the expected fraction of tokens in d that are assigned the same topic t.

Furthermore, in embodiments, the documents for the Web search may be ranked according to the following document ranking equations:

$$P(q|d) = \pi_{q \in q} P_s(q|d), \quad (8)$$

$$P_s(q|d) = \lambda_1 P(q|C) + (1-\lambda_1) P_{mx}(q|d), \quad (9)$$

$$P_{mx}(q|d) = \lambda_2 P(q|d) + (1-\lambda_2) P_{blm}(q|d), \text{ and} \quad (10)$$

$$P_{blm}(q|d) = \Sigma_z P(q|\phi_z^q) P(z|\theta^d), \quad (11)$$

where $P(q|C)$ and $P(q|d)$ are the unsmoothed background model and document model, respectively, and $\lambda_1$ and $\lambda_2$ are tuning parameters with values between 0 and 1.

Figure 4:
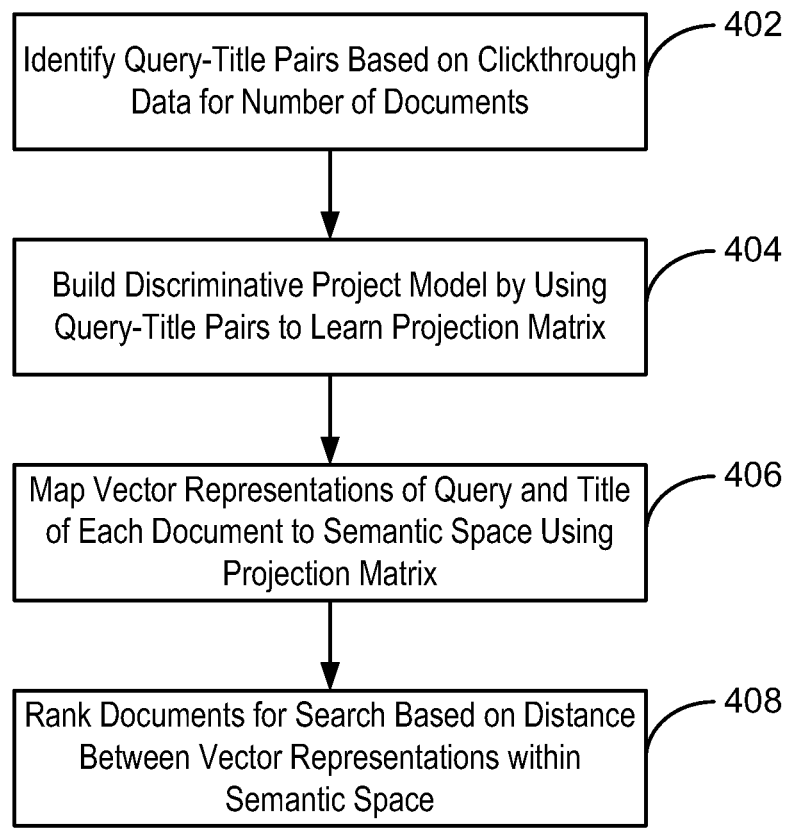
FIG. 4 is a process flow diagram of a method for ranking documents using a discriminative projection model.

FIG. 4 is a process flow diagram of a method 400 for ranking documents using a discriminative projection model. The discriminative projection model is a type of latent semantic model, as described with respect to FIG. 1. The discriminative projection model may be used to rank documents for a Web search according to the relevance of the documents to a query. The Web search may be conducted, for example, over a network via a search engine.

The method 400 begins at block 402 with the identification of a number of query-title pairs based on clickthrough data for a number of documents. At block 404, a discriminative projection model may be built by using the query-title pairs to learn a projection matrix.

In various embodiments, an entire document for a Web search may be modeled using a n×d document-term matrix C, where n is the number of documents and d is the number of word types. The document-term matrix C may be factored into the product of three matrices using singular value decomposition (SVD) according to the following equation:

$$C = U \Sigma V^T. \quad (12)$$

where the orthogonal matrices U and V are called term and document vectors, respectively, and the diagonal elements of $\Sigma$ are singular values in descending order. Then, a low-rank matrix approximation of C is generated by retaining only the k biggest singular values in $\Sigma$. A document or a query represented by a term vector D can be mapped to a low-dimensional concept vector $\hat{D}$ according to the following equation:

$$\hat{D} = A^T D, \quad (13)$$

where the d×k matrix $A = U_k \Sigma_k^{-1}$ is the projection matrix. In the Web search, the relevance score between a query and a document, represented respectively by term vectors Q and D, is assumed to be proportional to their cosine similarity score of the corresponding concept vectors $\hat{Q}$ and $\hat{D}$, according to the projection matrix A. The cosine similarity score is calculated as follows:

$$sim_A(Q, D) = \frac{\hat{Q} \hat{D}}{\|\hat{Q}\| \|\hat{D}\|}. \quad (14)$$

In some embodiments, the projection matrix may be learned from query-title pairs using Siamese Neural Network (S2Net), a newly proposed learning framework that learns the projection matrix discriminatively from pairs of related and unrelated documents. S2Net treats a raw term vector as the input layer and a mapped concept vector as the output layer. The value of each node in the output layer is a linear sum of all the input nodes, where the weights are associated with the edges. In other words, the network structure is a complete bipartite graph between the input and output layers, and the edge weights are equivalent to the form of the linear projection matrix A.

The design of the loss function in S2Net follows a pairwise learning-to-rank paradigm. Consider a query q and two documents $d_1$ and $d_2$, where $d_1$ has clicks for q but $d_2$ does not Let Q, $D_1$, and $D_2$ be the term vectors of q, $d_1$, and $d_2$, respectively. Two pairs of term vectors (Q, $D_1$) and (Q, $D_2$) may be constructed, where the former is preferred and should be ranked higher. Given the projection matrix A, let $\Delta$ be the difference in the cosine similarity scores of their projected concept vectors. Namely, $\Delta = sim_A(Q, D_1) - sim_A(Q, D_2)$. The discriminative projection model may be learned such that $\Delta$ is increased. The following logistic loss function over $\Delta$ may be used, which can be shown to upper-bound the pairwise accuracy:

$$L(\Delta; A) = \log(1 + \exp(-\gamma \Delta)), \quad (15)$$

where $\gamma$ is a scaling factor that magnifies $\Delta$ from [−2, 2] to a larger range. In various embodiments, the discriminative projection model may be initially learned from the projection matrix A, and the S2Net procedure may be used to regularize the discriminative projection model.

At block 406, vector representations of a query and a title of each of the documents may be mapped to a semantic space using the projection matrix. The vector representations of the query and the titles of the documents may be sparse, high-dimensional term vectors, while the semantic space may be a dense, low-dimensional space. In various embodiments, the projection matrix may be used to map the vector representations to the semantic space through a matrix multiplication procedure. Further, the cosine similarity score described above may be used to determine a similarity between the vector representations of the query and a title of each of the documents.

At block 408, the documents may be ranked for a Web search based on the distance between the vector representations of the query and the title of each of the documents within the semantic space. The distance between the vector representations may be used as a measure of relevance of a particular document to the query. A lower distance between the vector representations may indicate a higher relevance of a corresponding document. In some embodiments, the documents with the highest cosine similarity scores with relation to the query may be considered to be the most relevant documents for the Web search. Further, the documents may be reordered for the Web search according to their relative relevance.

Figure 5:
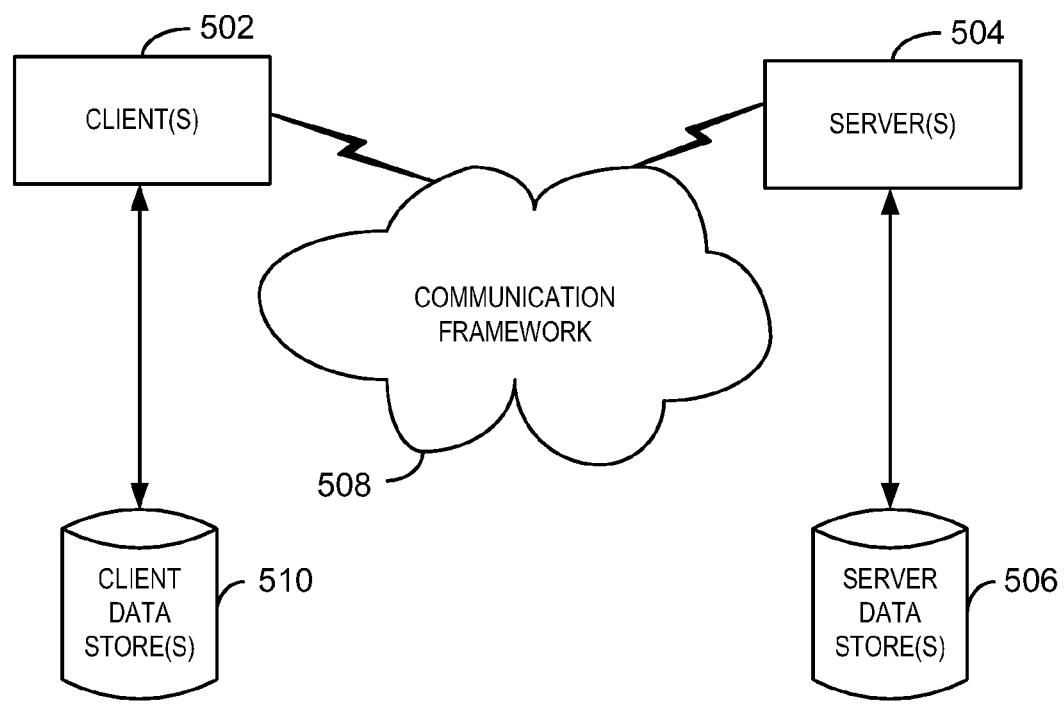
FIG. 5 is a block diagram of a networking environment in which a latent semantic model for ranking documents in a search may be implemented.
Figure 6:
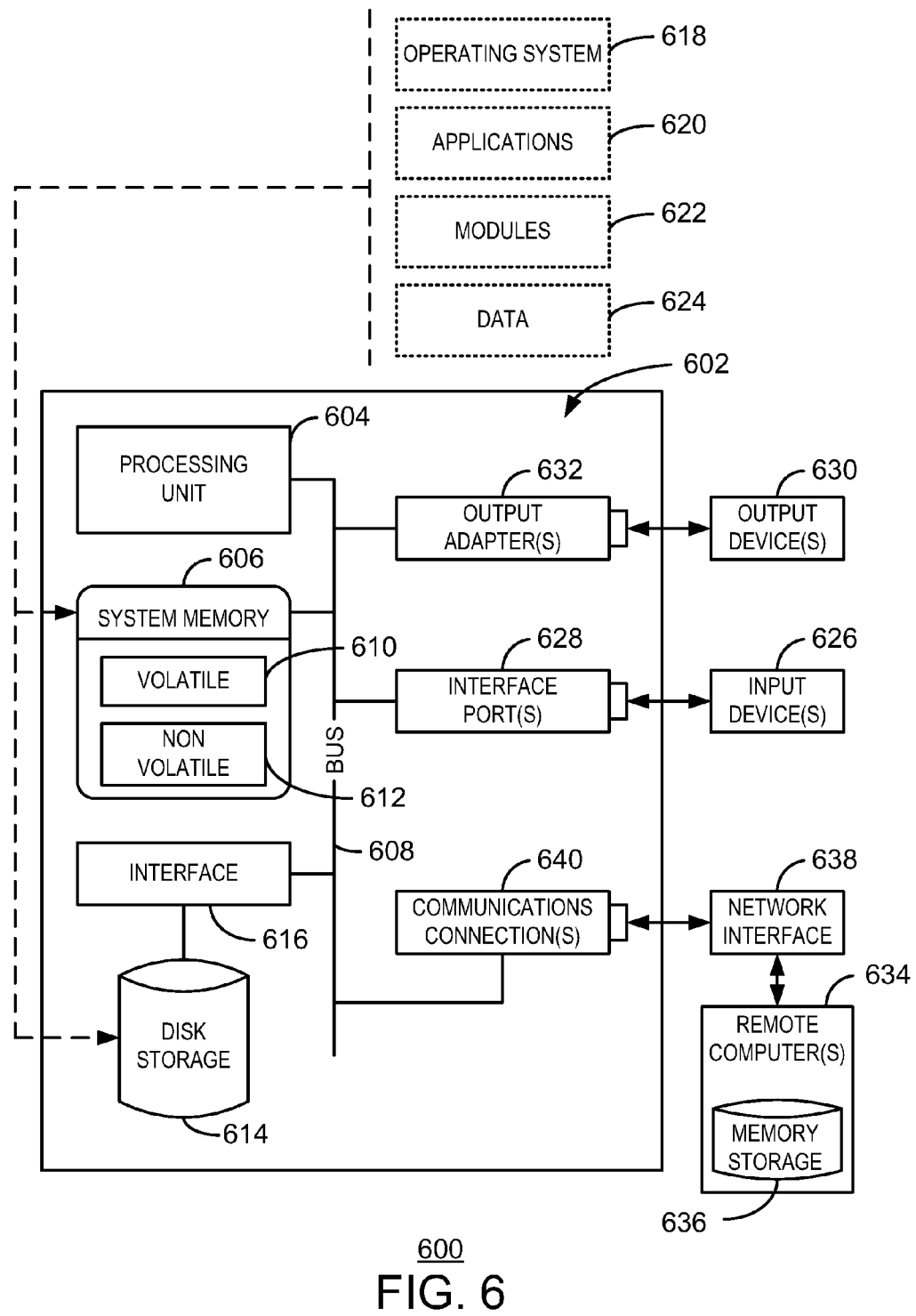
FIG. 6 is a block diagram of a computing environment that may be used to implement a latent semantic model for ranking documents in a search.

In order to provide additional context for implementing various aspects of the claimed subject matter, FIGS. 5-6 and the following discussion are intended to provide a brief, general description of a suitable computing environment in which the various aspects of the subject innovation may be implemented. For example, latent semantic models, such as the bilingual topic model and the discriminative projection model, can be implemented in such a suitable computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, etc., that perform particular tasks or implement particular abstract data types.

Moreover, those of skill in the art will appreciate that the subject innovation may be practiced with other computer system configurations, including single-processor or multi-processor computer systems, minicomputers, mainframe computers, as well as personal computers, hand-held computing devices, microprocessor-based or programmable consumer electronics, and the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 5 is a block diagram of a networking environment 500 in which a latent semantic model for ranking documents in a search may be implemented. In one embodiment, the search may be a Web search. The networking environment 500 includes one or more client(s) 502. The client(s) 502 can be hardware and/or software (e.g., threads, processes, or computing devices). The networking environment 500 also includes one or more server(s) 504. The server(s) 504 can be hardware and/or software (e.g., threads, processes, or computing devices). The servers 504 can house threads to perform search operations by employing the subject innovation, for example.

One possible communication between a client 502 and a server 504 can be in the form of a data packet adapted to be transmitted between two or more computer processes. The networking environment 500 includes a communication framework 508 that can be employed to facilitate communications between the client(s) 502 and the server(s) 504. The client(s) 502 are operably connected to one or more client data store(s) 510 that can be employed to store information local to the client(s) 502. The client data store(s) 510 may be stored in the client(s) 502, or may be located remotely, such as in a cloud server. Similarly, the server(s) 504 are operably connected to one or more server data store(s) 506 that can be employed to store information local to the servers 504.

As an example, the client(s) 502 may be computers providing access to social search engine sites over a communication framework 508, such as the Internet. The server(s) 504 may be search engine sites accessed by the client 502.

FIG. 6 is a block diagram of a computing environment 600 that may be used to implement a latent semantic model for ranking documents in a Web search. The computing environment 600 includes a computer 602. The computer 602 includes a processing unit 604, a system memory 606, and a system bus 608. The system bus 608 couples system components including, but not limited to, the system memory 606 to the processing unit 604. The processing unit 604 can be any of various available processors. Dual microprocessors and other multiprocessor architectures also can be employed as the processing unit 604.

The system bus 608 can be any of several types of bus structures, including the memory bus or memory controller, a peripheral bus or external bus, or a local bus using any variety of available bus architectures known to those of ordinary skill in the art. The system memory 606 is non-transitory, computer-readable media that includes volatile memory 610 and nonvolatile memory 612. The basic input/output system (BIOS), containing the basic routines to transfer information between elements within the computer 602, such as during start-up, is stored in nonvolatile memory 612. By way of illustration, and not limitation, nonvolatile memory 612 can include read-only memory (ROM), programmable ROM (PROM), electrically-programmable ROM (EPROM), electrically-erasable programmable ROM (EEPROM), or flash memory.

Volatile memory 610 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 602 also includes other non-transitory, computer-readable media, such as removable/non-removable, volatile/non-volatile computer storage media. FIG. 6 shows, for example, a disk storage 614. Disk storage 614 includes, but is not limited to, devices like a magnetic disk drive, floppy disk drive, tape drive, Jaz drive, Zip drive, LS-100 drive, flash memory card, or memory stick.

In addition, disk storage 614 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 614 to the system bus 608, a removable or non-removable interface is typically used, such as interface 616.

It is to be appreciated that FIG. 6 describes software that acts as an intermediary between users and the basic computer resources described in the computing environment 600. Such software includes an operating system 618. Operating system 618, which can be stored on disk storage 614, acts to control and allocate resources of the computer 602.

System applications 620 take advantage of the management of resources by operating system 618 through program modules 622 and program data 624 stored either in system memory 606 or on disk storage 614. It is to be appreciated that the claimed subject matter can be implemented with various operating systems or combinations of operating systems.

A user enters commands or information into the computer 602 through input devices 626. Input devices 626 include, but are not limited to, a pointing device (such as a mouse, trackball, stylus, or the like), a keyboard, a microphone, a joystick, a satellite dish, a scanner, a TV tuner card, a digital camera, a digital video camera, a web camera, or the like. The input devices 626 connect to the processing unit 604 through the system bus 608 via interface port(s) 628. Interface port(s) 628 include, for example, a serial port, a parallel port, a game port, and a universal serial bus (USB). Output device(s) 630 may also use the same types of ports as input device(s) 626. Thus, for example, a USB port may be used to provide input to the computer 602, and to output information from computer 602 to an output device 630.

Output adapter 632 is provided to illustrate that there are some output devices 630 like monitors, speakers, and printers, among other output devices 630, which are accessible via adapters. The output adapters 632 include, by way of illustration and not limitation, video and sound cards that provide a means of connection between the output device 630 and the system bus 608. It can be noted that other devices and/or systems of devices provide both input and output capabilities, such as remote computer(s) 634.

The computer 602 can be a server hosting a search engine site in a networking environment, such as the networking environment 500, using logical connections to one or more remote computers, such as remote computer(s) 634. The remote computer(s) 634 may be client systems configured with web browsers, PC applications, mobile phone applications, and the like. The remote computer(s) 634 can be a personal computer, a server, a router, a network PC, a workstation, a microprocessor based appliance, a mobile phone, a peer device or other common network node and the like, and typically includes many or all of the elements described relative to the computer 602. For purposes of brevity, the remote computer(s) 634 is illustrated with a memory storage device 636. Remote computer(s) 634 is logically connected to the computer 602 through a network interface 638 and then physically connected via a communication connection 640.

Network interface 638 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 640 refers to the hardware/software employed to connect the network interface 638 to the system bus 608. While communication connection 640 is shown for illustrative clarity inside computer 602, it can also be external to the computer 602. The hardware/software for connection to the network interface 638 may include, for example, internal and external technologies such as, mobile phone switches, modems including regular telephone grade modems, cable modems and DSL modems, ISDN adapters, and Ethernet cards.

An exemplary embodiment of the computer 602 may be a server hosting a search engine site. An exemplary processing unit 604 for the server may be a computing cluster comprising Intel® Xeon CPUs. The search engine may be configured to perform ranking of documents relating to search queries according to the subject innovation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for ranking documents, comprising:
   identifying a plurality of query-document pairs based on clickthrough data for a plurality of documents;
   building a latent semantic model based on the plurality of query-document pairs, wherein the plurality of query-document pairs comprises a plurality of query-title pairs, wherein the title in each query-title pair is a title of one of the documents of the plurality of documents, and wherein building the latent semantic model comprises building a bilingual topic model, a query being considered as expressed in a first language and the document being considered as expressed in a second language, by using the plurality of query-title pairs to learn a semantic representation of a query based on a likelihood that the query is a semantics-based translation of each of the plurality of documents;
   ranking the plurality of documents for a Web search based on a distance between vector representations of a query and a title of each of the plurality of documents within a semantic space, wherein a projection matrix is used to map the vector representations of the query and the title of each of the plurality of documents to the semantic space, wherein the semantic space comprises a dense, low-dimensional space; and
   ranking the plurality of documents for the Web search based on the latent semantic model.

2. The method of claim 1, wherein ranking the plurality of documents based on the latent semantic model comprises reordering the plurality of documents for the Web search based on a relevance of each of the plurality of documents to a second query.

3. The method of claim 1, comprising ranking the plurality of documents for the Web search based on the likelihood that the query is the semantics-based translation of each of the plurality of documents.

4. The method of claim 1, wherein building the latent semantic model based on the plurality of query-document pairs comprises building a discriminative projection model by using the plurality of query-document pairs to learn the projection matrix.

5. The method of claim 4, comprising generating the vector representations of the query and the title of each of the plurality of documents, wherein the vector representations comprise sparse, high-dimensional term vectors.

6. The method of claim 1, wherein a query and a paired title of one of the plurality of documents comprise a common distribution of topics, and wherein the query and the paired title use different vocabularies or language styles, or both, to express the common distribution of topics.

7. A system for ranking documents, comprising:
   a processor that is adapted to execute stored instructions; and
   a system memory, wherein the system memory comprises code configured to:
      identify a plurality of query-title pairs based on clickthrough data for a plurality of documents, wherein the title in each query-title pair is a title of one of the documents of the plurality of documents;
      build a latent semantic model, a query being considered as expressed in a first language and the document being considered as expressed in a second language, the latent semantic model being based on the plurality of query-title pairs by building a bilingual topic model by learning a semantic representation of a query based on a likelihood that the query is a semantics-based translation of each of the plurality of documents;
      rank the plurality of documents for a search based on a distance between vector representations of a query and a title of each of the plurality of documents within a semantic space, wherein a projection matrix is used to map the vector representations of the query and the title of each of the plurality of documents to the semantic space, wherein the semantic space comprises a dense, low-dimensional space; and rank the plurality of documents for the search based on the latent semantic model.

8. The system of claim 7, wherein the system memory comprises code configured to identify the plurality of query-title pairs using posterior regularization.

9. The system of claim 7, wherein the system memory comprises code configured to identify the hidden topics or semantic representation of the plurality of query-title pairs in a language-independent manner using maximum a posteriori (MAP) estimation techniques.

10. The system of claim 7, wherein the system memory comprises code configured to rank the plurality of documents for the search based on the likelihood that the query is the semantics-based translation of each of the plurality of documents.

11. The system of claim 7, wherein the query and a paired title of one of the plurality of documents comprise a common distribution of topics, and wherein the query and the paired title use different vocabularies or language styles, or both, to express the common distribution of topics.

* * * * *